United States Patent [19]

Lenox

[11] 4,119,827
[45] Oct. 10, 1978

[54] CLINCH WELD FASTENER AND METHOD OF SECURING PANELS TOGETHER

[75] Inventor: Clayton R. Lenox, Allen Park, Mich.

[73] Assignee: General Motors Corporation, Detroit, Mich.

[21] Appl. No.: 780,795

[22] Filed: Mar. 24, 1977

[51] Int. Cl.² .................. B23K 9/00; B23K 11/04
[52] U.S. Cl. .................................. 219/98; 29/432; 29/509; 151/41.73; 403/271; 403/282
[58] Field of Search ............... 29/432, 509, 526, 455; 219/98, 99, 101, 94; 403/271, 282; 151/41.73

[56] References Cited

U.S. PATENT DOCUMENTS

| | | | |
|---|---|---|---|
| 2,414,270 | 1/1947 | O'Connor | 219/94 X |
| 2,563,107 | 8/1951 | Fanger | 29/432 X |
| 2,707,322 | 3/1955 | Strain et al. | 29/432 |
| 3,004,139 | 10/1961 | Dash | 219/99 |
| 3,340,379 | 9/1967 | Sweeney | 219/99 |
| 3,488,466 | 1/1970 | Paupitch | 219/98 X |
| 3,724,520 | 4/1973 | Ladouceur et al. | 29/432 X |
| 3,774,009 | 11/1973 | Hodges | 219/98 |
| 3,810,291 | 5/1974 | Ladouceur | 29/432 X |
| 3,975,611 | 8/1976 | Gordon | 219/98 |
| 4,032,742 | 6/1977 | Kendrick et al. | 219/99 |

*Primary Examiner*—Charlie T. Moon
*Attorney, Agent, or Firm*—Arthur N. Krein

[57] ABSTRACT

A clinch weld fastener and method of using the same to effect attachment of a non-ferrous panel, such as an aluminum panel, to a ferrous panel, such as a steel panel. The clinch weld fastener is in the form of a clinch nut blank, preferably of the self-piercing type, with weld projections extending from one end thereof. To effect assembly of the two panels together, the clinch weld fastener is first clinched to the aluminum panel with the weld projections extending outward from one surface thereof and then after placing the aluminum panel with the weld projections in abutment against the steel panel, projection welding the clinch weld fastener to the steel panel thereby securing the aluminum panel to the steel panel.

10 Claims, 4 Drawing Figures

CLINCH WELD FASTENER AND METHOD OF SECURING PANELS TOGETHER

This invention relates to a fastener and to a method of using the same for securing a first panel to a second panel and, in particular, to a clinch weld fastener which is adapted to be mechanically secured to a first panel of non-ferrous material and then welded to the second panel of ferrous material.

In various assemblies or sub-assemblies, such as used in the automotive industry, two panels are secured together into a unitary structure. Thus, for example, the engine compartment hood of a motor vehicle has typically consisted of a steel outer member and a steel inner member with these panels being secured together at their outer peripheral rim flanges as by resistance welding, the joint being made at these flanges since they would not be visible in the usual closed position of the hood, as assembled on a vehicle.

Normally, resistance welding is carried out by locating the surfaces to be joined in overlapping abutting relationship wherein the greatest resistance to the current flow path is the interface at the joint. By forcing an electric current through the interface, heating occurs there to a greater extent than at other current portions of the work with the result that the melting point of the metal at the joint is reached first. Pressure is applied until the molten metal solidifies to form a weld. This method is commonly manifested in spot welding, projection welding, and butt welding techniques, all of which are well known and widely practiced methods for joining metals.

In order to reduce vehicle weight, it is apparent that a weight reduction advantage can be obtained in such two panel assemblies or sub-assemblies if one of the panels is made of aluminum even though the other panel is still made of steel. However, conventional resistance welding techniques, such as described for use in joining, for example, two steel panels together, are of little or no practical use to effect attachment of an aluminum panel to a steel panel in the same manner.

Various proposals have been made in the past relative to specific methods and apparatus adapted for use in joining, for example, a non-ferrous panel to a panel of ferrous metal. The term "ferrous metal" is intended to include iron and steel, as well as stainless steel and other alloys of which iron is the predominant portion or the base. As typical of such proposals, reference is made to U.S. Pat. Nos. 1,190,208 entitled "Method of Making Welds with Pieces of Coated Metal and Product Thereof" issued to William E. Williams on July 4, 1916; 1,592,605 entitled "Electric Welding" issued to Joseph Ledwinka on July 13, 1926; and, 2,941,064 entitled "Method of Welding Sheet Steel Members Having Liner Sheets" issued to Ralph H. Gieser, Jr. and John R. Thomson on June 14, 1960.

However, none of the known prior art proposals, including those disclosed in the above-identified patents, for joining dissimilar panels together are really practical for use on a mass production basis to join together large and intricately shaped panels, such as vehicle hood panels. Thus, for example, with reference to the electric welding method disclosed in the above-identified U.S. Pat. No. 1,592,605, fastening by this method would, during assembly of such a hood, obviously require that the rim flanges of the two panels be positioned horizontally between the upper and lower electrodes of the welding unit so that a ball or hemisphere can be retained during welding, which obviously would require periodic movement of the panels and, would also require an operator to hand position each of the balls or hemispheres used in effecting each weld joint about the outer peripheral rim flanges of these panels.

It is therefore the primary object of this invention to improve a fastener and method of its use for securing two panels of dissimilar materials together.

Another object of this invention is to improve a fastener for use both as a clinch fastener to be secured to a first panel of non-ferrous material and, as a weld fastener for welding to a second panel of ferrous material whereby the first and second panels are secured together by the fastener.

A further object of this invention is to improve a method for use in securing together two panels of dissimilar materials by the use of a clinch weld fastener which is first clinched to one of the panels and then welded to the other panel.

These and other objects of the invention are obtained by a clinch weld fastener which consists of a fastener body substantially in the form of a conventional clinch nut, preferably having a pilot portion of the self-piercing type adapted to pierce an opening in a panel to which the fastener is to be attached while the clinch nut is simultaneously secured in the panel opening by the use of a press or die, as is well known, the fastener body further being provided with one or more weld projections located on the pilot portion of the fastener body so as to extend outward from the panel to which the fastener is clinched whereby it can be pressed into abutment against a second panel to be welded thereto, as by resistance welding. In accordance with the method of the invention, the clinch weld fastener is positioned in an opening in a first panel of non-ferrous material and then clinched to this panel with the weld projections of the fastener extending from one surface of the first panel, these method steps being done either in the sequence described or simultaneously. The first panel is then positioned closely adjacent to a second panel of ferrous material with the weld projections of the fastener in abutment against the second panel and then resistance welding the clinch weld fastener to the second panel thereby effecting attachment of the first panel to the second panel.

For a better understanding of the invention, as well as other objects and further features thereof, reference is had to the following detailed description of the invention to be read in connection with the accompanying drawings, wherein.

Figure 1:
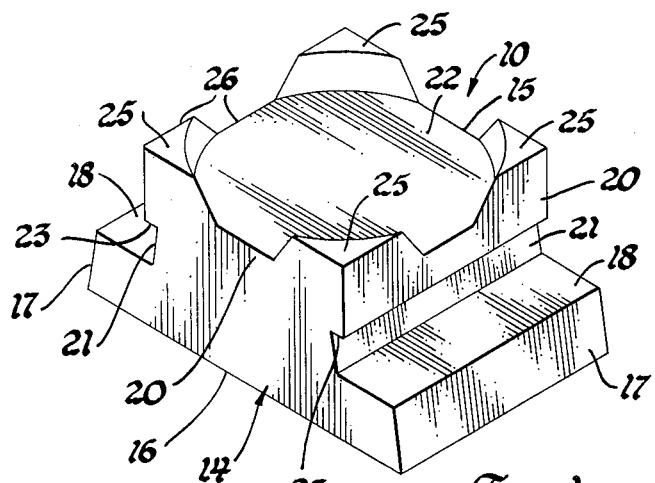
FIG. 1 is an enlarged perspective view of one form of clinch weld fastener in accordance with the invention, the clinch weld fastener being of the self-piercing type.
Figure 2:
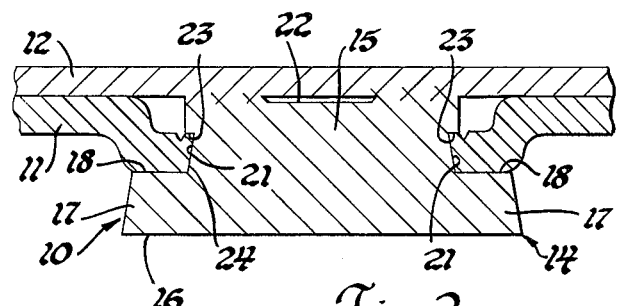
FIG. 2 is an enlarged sectional view of the clinch weld fastener of FIG. 1 clinched to a first panel and welded to a second panel.

Referring first to FIG. 2, there is shown a clinch weld fastener 10 of the invention as shown in FIG. 1 that is used to effect attachment of a panel of non-ferrous material, such as aluminum panel 11, to a panel of ferrous material, such as steel panel 12, the clinch weld fastener being mechanically fixed by clinching to the aluminum panel and projection welded at one end to the steel panel 12.

Referring now to the embodiment of the clinch weld fastener 10 shown in FIG. 2, which is used to effect the assembly shown in FIG. 2, it is illustrated in the construction shown as being rectangular in shape and is formed as a one-piece body of suitable material for its intended function and includes a head 14 from which a reduced pilot portion 15 projects. The head 14 includes, in the orientation of FIG. 1, a planar bottom surface 16 and a pair of laterally projecting flanges 17 having upper bearing or base surfaces 18 which normally abut one surface of the panel, such as aluminum panel 11, to which the fastener is affixed, as will be hereinafter more fully described. The pilot portion 15 includes vertically extending sides 20 with at least two of such opposed sides, each having undercut shallow clinch recesses or grooves 21 therein, hereinafter referred to as grooves 21. The undercut grooves 21 are disposed intermediate the bearing or base surfaces 18 and the upper free end face 22 of the pilot portion 15. The walls defining the grooves 21 may be tapered, as shown, may be perpendicular to the base surfaces 18 or a combination of tapered and perpendicular portions, as is well known. Each groove 21 provides in the pilot portion an abutment surface 23, spaced a predetermined distance from the base surfaces 18, depending on the thickness of the panel to which it is to be attached whereby these abutment surfaces will abut against the opposite surface of the panel to which the fastener is affixed.

The fastener structure thus far described is similar to that of a conventional clinch nut, except in the construction illustrated, the subject fastener has not been provided with an internally threaded aperture. The fastener 10, as thus far described, is thus adapted to be mechanically fixed by clinching to the aluminum panel 11 in a well known manner as by means of a panel forming die, not shown, whereby the edges of the panel 11 encircling the pilot opening therethrough are received within the grooves 21 to effect attachment of this fastener to the panel.

Now in accordance with the invention, the free end of the pilot portion 15 is also provided with one or more suitable conducting weld projections or points 25, hereinafter referred to as projections, which extend outward from the upper face 22 of the pilot portion, four such weld projections 25 being shown in the construction illustrated, with these located at the corners of the pilot portion. Preferably, as shown, the weld projection 25 each appears to be triangular in shape with two sides of each projection being coplanar with the vertically extending sides 20 of the pilot portion and the upper surface of each such projection 25 being substantially flat whereby the upper surface of the pilot portion 15 and the upper surface of these projections are provided with peripheral shearing edges 26 whereby this fastener, as is well known, can be used as part of a punch and die combination whereby this fastener is used to pierce its own opening in the panel 11 for receiving the pilot portion 15 thereof.

The height of the pilot portion 15 between its upper surface 22 and the bearing or base surfaces 18 is such that, depending on how the fastener is fixed to the aluminum panel 11, the pilot portion will extend through the pilot opening in this panel so that the upper surface 22 will lie preferably in or below the plane of the major flat surface on one side of the panel, the upper surface of panel 11 with reference to FIG. 2, if it is desired to have the panel 11 abut panel 12 in the final assembly of these panels as shown in FIG. 2. With the pilot portion thus dimensioned, the weld projection 25 will extend beyond the upper surface of the panel 11 after this clinch weld fastener has been clinched thereto so that these weld projection can be brought into abutment against one side of the steel panel 12.

To effect attachment of the aluminum panel 11 to the steel panel 12, the clinch weld fastener 10 is first mechanically secured by clinching to the aluminum panel 11. To effect this, the aluminum panel 11 can be provided with a preformed pilot opening 24 to receive the pilot portion 15 or the clinch weld fastener can be used in conjunction with a suitable die, not shown, as a self-piercing fastener to pierce its own pilot opening in the panel 11, and then the material of the panel 11 surrounding the pilot opening therein is caused to flow, as by a suitable die, into grooves 21 in a well-known manner, as disclosed, for example, in U.S. Pat. Nos. 3,152,628 entitled "Clinch Nut" issued Oct. 13, 1964 to William E. Strain and Jerry H. Steward and 3,187,427 entitled "Method of Installing a Clinch Nut" issued June 8, 1965 to Plummer E. Double. On the other hand, if the pilot opening has been preformed, clinching can also be effected, if desired, by upsetting portions of the pilot portion to effect entrapment of the panel in the grooves 21 in the manner disclosed, for example, in the above-identified U.S. Pat. No. 3,187,427.

Since, in the construction illustrated in FIG. 2, the aluminum panel 11 would be slightly embossed to effect the clinching of a clinch weld fastener to the panel in the manner shown, the pilot portion 15 in this embodiment is preferably equal to or slightly less in height, as shown, relative to the overall height of the embossment so that, after assembly of the clinch weld fastener 10 to the aluminum sheet 11, the weld projection 25 would extend beyond the major planar surface of the aluminum panel 11 and, so that after welding, the aluminum panel 11 will be fixed to the steel panel 12 in abutment thereagainst in the manner illustrated.

After the clinch weld fastener 10 has been secured to the aluminum panel 11, it being noted that more than one such clinch fastener may be secured to a given panel, the aluminum panel 11 is positioned next adjacent to the steel panel 12 with the weld projection 25 of the clinch weld fastener 10 in abutment against the steel panel and then the clinch weld fastener is projection welded to the steel panel 12 in a well-known manner, for example, as disclosed in U.S. Pat. No. 2,734,118 entitled "Method of Electric Welding" issued Feb. 7, 1956 to Alexander S. Patten. As known, during this welding process, the members are held together under pressure while applying heat to the weld projections 25 so that they will melt and project into the contact area of the steel panel 12 with possibly some flattening of the projections.

Figure 3:
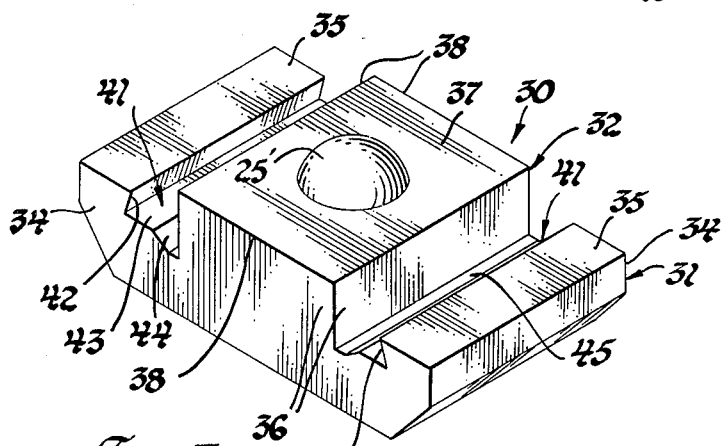
FIG. 3 is an enlarged perspective view of an alternate embodiment of a clinch weld fastener in accordance with the invention, this fastener also being of the self-piercing type; and, FIG. 4 is an enlarged sectional view of the clinch weld fastener of FIG. 3 clinched to a first panel and welded to a second panel.

Referring now to the alternate embodiment of the clinch weld fastener, generally designated 30, shown in FIG. 3, it is also, in the construction illustrated, of rectangular configuration and formed as a one-piece body including a head 31 from which a reduced pilot portion 32 projects. The head 31 includes, with reference to its orientation in FIGS. 3 and 4, a planar bottom surface 33 and a pair of flanges 34 having upper bearing or base surfaces 35 which normally abut one surface of a panel, such as aluminum panel 11', to which the fastener is to be affixed. The pilot portion 32 includes vertically extending sides 36 extending up to the upper free end face 37 thereof whereby to provide peripheral shearing edges 38 at the free end of the pilot portion.

The upper bearing or base surfaces 35 of the head 31 in the flange portions thereof are provided with undercut shallow clinch recesses or grooves 41 disposed next adjacent to the pilot portion 32. Each groove 41 is defined by an inner wall which, in effect, is an extension of a side wall 36 of the pilot portion and an outer wall 42 which diverges from the wall 36 as the outer wall extends inwardly from the bearing or base surface 35. In the construction illustrated, at the bottom of outer wall 42, a flat abutment surface 43, parallel to bearing or base surface 35, extends across approximately one-half the width of the groove 41 to a bevelled surface 44 inclined inwardly toward the pilot portion at a predetermined desired angle of, for example, (45°), to terminate at a flat bottom surface 45, these latter surfaces defining a further recess at the bottom of a groove 41 to receive the free end of a clinching tool or die, as is well known in the art, as disclosed, for example, in U.S. Pat. No. 3,878,599 entitled "Method of Forming a Nut and Panel Assembly" issued Apr. 22, 1975 to Harold A. Ladouceur and John H. Steward.

The structure of the clinch weld fastener 30, thus far described, like the fastener 10, is also similar to that of a conventional clinch nut, of the self-piercing type, except, in the construction illustrated, the subject fastener has not been provided with an internally threaded aperture. The clinch weld fastener 30, thus far described, is thus adapted to be mechanically fixed by clinching to the aluminum panel 11', by means of a panel forming die, in a well-known manner, whereby the edges of the panel 11' encircling the pilot opening therethrough can be swaged or deformed into the grooves 41 to effect attachment of this fastener to the aluminum panel 11'.

In accordance with the invention, the free end of the pilot portion 32 is also provided with one or more suitable conducting weld projection 25' which stand outward from the upper surface 37 of the pilot portion, one such weld projection 25' being shown in the construction illustrated, with this weld projection being located approximately centrally of the upper surface 37 of the pilot portion.

Figure 4:
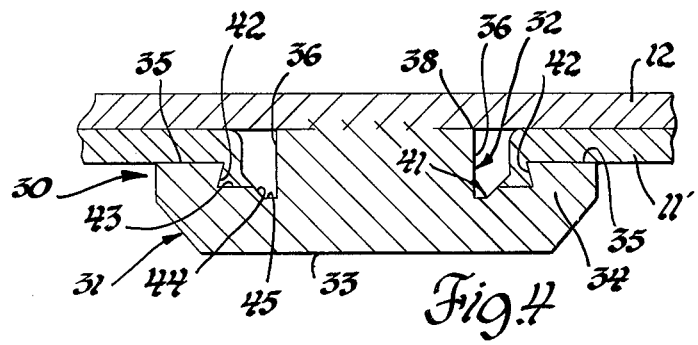

To effect attachment of the aluminum panel 11' to the steel panel 12 in order to obtain the structure illustrated in FIG. 4, the clinch weld fastener 30 is first mechanically secured by clinching to the aluminum panel 11' in a conventional manner, for example, as disclosed in the above-identified U.S. Pat. No. 3,878,599.

Since the clinch weld fastener 30, in the construction illustrated, is adapted for flush mounting relative to one side of the aluminum panel 11', without the necessity of embossing the area around the fastener to provide a suitable recess in the manner shown in the construction of FIG. 2, the height of the pilot portion 32 extending above the bearing or base surfaces 35 is preferably equal to or less than the thickness of the aluminum panel 11' to which it is to be attached. With the pilot portion 32 thus dimensioned, the weld projection 25' will extend beyond the surface of the panel 11' after the clinch weld fastener 30 has been clinched thereto so that this weld projection can be brought into abutment against one side of the steel panel 12 to effect projection welding, in the manner previously described, of the clinch weld fastener to the steel panel 12 to thereby effectively secure the aluminum panel 11' to the steel panel 12.

Although only two embodiments of clinch weld fasteners in accordance with the invention have been illustrated and described, it will be apparent to those skilled in the art that the clinch fastener portion of the subject fastener can be of any desired shape and size with the pilot portion thereof being any desired configuration, such as hex, D-shaped, round or rectangular, as shown. It will also be apparent that either of the two basic methods, conventionally used in the clinch nut art, may be employed to attach the clinch weld fastener to the non-ferrous panel with which it is to be associated, that is, the pilot portion may be peened over (clinched), staked or expanded to retain the fastener or, the fastener can, in effect, be squeezed into the pilot opening, either previously formed in the panel or formed by self-piercing of the clinch weld fastener, by pressure so that parent material of the panel is caused to flow or to be extruded into the retaining or clinch grooves provided in the fastener for this purpose. It will also be apparent to those skilled in the art that the weld projections 25 and 25' can be of any desired shape or size, any number may be used and their location may be at any location on the free end of the pilot portion, as desired, since this is well known in the projection welding art.

Since a clinch weld fastener in accordance with the invention once clinched to a non-feerous panel becomes a permanent part of that panel, it will be apparent that such clinch weld fasteners can readily be assembled to the non-ferrous panel or member with which they are to be associated well in advance of the final assembly step fastening or securing the non-gerrous panel to a ferrous panel. It will also be apparent that, although the mating panels illustrated are shown as if assembled while in a horizontal position, these panels can be at any desired position during the final assembly welding process, since the subject clinch weld fasteners do become a permanent part of the non-ferrous panel to which they have been clinched.

Although the panels of non-ferrous material have been identified as aluminum panels 11 or 11' in the above description, it should be realized that these panels can be made, as desired, of any non-ferrous metal or other material, it only being necessary to realize that if the parent material of such a non-ferrous panel is to be caused to flow or to be extruded into the clinch grooves provided in the clinch weld fastener, the material of this panel must be readily deformable so as to permit the above-described operation to be effected.

It will also be apparent to those skilled in the art that, although the clinch weld fasteners of the invention have been described and illustrated as being without an internally threaded aperture therein, the clinch weld fastener, for example, as shown in the embodiment of FIG. 1, could readily be provided with such an internally threaded aperture or, alternately, if desired, a clinch weld fastener in accordance with the invention could be provided with an externally threaded shank extending, for example, from either the surface 16 of fastener 10 or from the surface 33 of fastener 30.

Although the subject clinch weld fastener has been described and illustrated as being used to connect, for example, an aluminum panel 11 to a steel panel 12, with reference to FIG. 2, it will be readily apparent to those skilled in the art that the clinch weld fastener could be used to secure more than one panel to the steel panel, as by elongating the pilot portion of the clinch weld fastener in an axial direction whereby one or more panels could be sandwiched between the aluminum panel 11 and the steel panel 12, suitable apertures, of course, being provided in such additional panels to permit the pilot portion to extend therethrough as necessary to effect its weld attachment to the steel panel 12.

What is claimed is:

1. A clinch weld fastener for clinched connection with a thin apertured, deformable first member and for welding to a second member whereby said first member is secured to said second member in abutment thereagainst by said clinch weld fastener, said clinch weld fastener having a body including a head means with a base surface on one side thereof and with a pilot portion extending integrally from said one side, said pilot portion being adapted to fit through an aperture in said first member so that said base surface can abut against one side of said first member, said body including at least two spaced apart undercut clinch groove means therein whereby material of said first member surrounding the aperture can be clinched into said undercut clinch groove means whereby said fastener can be mechanically secured to said first member, said pilot portion having an end surface opposite said head means with integral weld projection means thereon, said pilot portion with said weld projection means thereon being of a predetermined length greater than the thickness of said first member whereby said weld projection means will extend outward from the opposite side of said first member after attachment thereto for engagement with said second member so that said weld projection means will be positioned to be projection welded to said second member whereby said first member can be secured to said second member.

2. A clinch weld fastener for use in securing a first panel of non-ferrous deformable material to a second panel of ferrous material, said clinch weld fastener including a head means with a base surface means on one side thereof and a pilot portion integral with said head means and extending outward from said base surface means, at least two spaced apart clinch groove means in said clinch weld fastener extending at least on opposite sides of said pilot portion and, weld projection means extending from the free end surface of said pilot portion, said clinch weld fastener being adapted to be mechanically clinched to said first panel by swaging of material of said first panel into said clinch groove means with one side of said first panel in abutment against said base surface means with said weld projection means extending from the opposite side of said first panel whereby said weld projection means can be brought into abutment against a side of said second panel to be projection welded thereto.

3. A clinch weld fastener for clinched connection with a thin apertured first panel of deformable material and for welding to a second panel, said clinch weld fastener having a body means including an enlarged head means with a pilot portin extending integrally from said one side thereof, said head means providing flange base surface means extending radially outward from said pilot portion, said pilot portion being adapted to fit through an aperture in said first panel so that said base surface can abut against one side of said first panel, said body means including at least two spaced apart clinch groove means therein whereby material of said first member surrounding the apeture can be clinched by swaging of material of said first panel into said clinch groove means so that said fastener is mechanically fixed to said first member, said pilot portion having an end surfaceopposite said head means with integral weld projection means extending therefrom, said pilot portion with said weld projection means thereon being of a predetermined length whereby said weld projection means extend outward from the opposite side of said first panel when clinched thereto for engagement with said second panel so that said weld projection means can be positioned to be projection welded to said second panel whereby said first panel can be secured to said second panel in sandwiched relationship between said second panel and said flange base surface means.

4. A method for securing a panel of non-ferrous deformable material to a ferrous panel by means of a clinch weld fastener comprising a body including a head having extending therefrom a pilot portion with weld projection means at the free end thereof and having undercut clinch groove means in the body thereof, said method including the steps of forming a through pilot opening for the pilot portion of the clinch weld fastener in said on-ferrous panel, inserting the pilot portion of said clinch weld fastener through said pilot opening until said head abuts against one side of said non-ferrous panel, mechanically securing by clinching the clinch weld fastener to said non-ferrous panel with the material of said nonferrous panel adjacent said pilot opening positioned in said undercut clinch groove means so that the weld projection means extend outward from one surface of said non-ferrous panel, positioning said non-ferrous panel adjacent to said ferrous panel with the weld projection means in abutment against said ferrous panel and, projection welding the weld projection means of said clinch weld fastener to said ferrous panel.

5. A method of securing a clinch weld fastener to a first panel of deformable material and to a second panel whereby said first panel is secured to said second panel in abutment thereagainst, the clinch weld fastener including a head means with a pilot portion extending therefrom, said head means providing flanged surfaces extending from opposite sides of said pilot portion, said clinch weld fastener further including undercut clinch groove means therein and weld projection means extending from the free end of said pilot portion, said method including the steps of forming a through pilot opening for said pilot portion of said clinch weld fastener in said first panel, inserting said pilot portion of the clinch weld fastener through said pilot opening until said flanged surfaces abut against one side of the first panel and mechanically securing by clinching said first panel to said clinch weld fastener with the material of said first panel being positioned in said undercut clinch groove means thereof, said weld projection means thereby being positioned to extend outward from the opposite side of said first panel, positioning said first panel adjacent to said second panel with the weld projection means in abutment against said second panel and, projection welding said weld projection means to the second panel.

6. The method of claim 5 wherein the step of forming a through pilot opening in said first panel and the step of inserting said pilot portion of said clinch weld fastener through the pilot opening and mechanically securing by clinching said first panel to said clinch weld fastener are done simultaneously, the clinch weld fastener thus being used as a selfpiercing fastener.

7. A one piece clinch weld fastener for clinched connection to a first sheet member of deformable material and for welding to a second member whereby the first sheet member can be secured to the second member, said clinch weld fastener having a body including a head means with a base surface on one side thereof and a pilot portion extending therefrom, said pilot portion having an end surface opposite said head means and having integral weld projection means thereon extending outward from said end surface, said pilot portion further having peripheral shearing edges at the free end thereof for use in piercing a pilot portion receiving aperture in the first panel member whereby said pilot portion can project through said first panel member with said base surface abutting against one side of the first panel member, said body including at last two shallow undercut clinch grooves therein on opposite sides of said pilot portion whereby material of the first panel member can be swaged into said clinch grooves so that said clinch weld fastener can be permanently fixed to the first panel member, said pilot portion with said weld projection means thereon being of a predetermined length whereby after said clinch weld fastener is fixed to the first panel member said weld projection means will extend outward from the opposite side of the first panel member for engagement with the second member whereby said weld projection means may be projection welded to the second member thereby effecting attachment of the first panel member to the second member.

8. A one piece clinch weld fastener for use in a fastening and piercing operation with a first panel of deformable material and for securing the first panel to a second panel, said clinch weld fastener including a head means with a base surface means on one side thereof and a pilot portion integral with said head means and extending at right angles outward from said base surface means, at least two undercut clinch grooves in said clinch weld fastener positioned in spaced apart relationship to each other, said pilot portion having an end surface opposite said head means, integral weld projection means on said pilot portion extending outward from said end surface, said pilot portion having peripheral shearing edges at the free end thereof adapted for use in piercing a pilot portion receiving aperture in the first panel, said clinch grooves being appropriately sized relative to the thickness of the first panel whereby material of the first panel can be swaged causing a portion of the material to flow into said clinch grooves so that said clinch weld fastener can be mechanically fixed to the first panel, the extent of said pilot portion and of said weld projection means being sized relative to the thickness of the first panel whereby after said clinch weld fastener is fixed to the first panel said weld projection means will extend outward from the first panel whereby said weld projection means can be brought into abutment against a side of the second panel so as to be projection welded thereto.

9. A one piece clinch weld fastener according to claim 8 wherein said undercut clinch grooves are provided on opposite sides of said pilot portion, adjacent to said base surface means.

10. A one piece clinch weld fastener according to claim 8 wherein said pilot portion is of a polygonal shape and wherein said undercut clinch grooves are in said head means on opposite sides of said pilot portion with the bottom of said undercut clinch grooves positioned below the plane of said base surface means.

* * * * *

UNITED STATES PATENT AND TRADEMARK OFFICE
CERTIFICATE OF CORRECTION

PATENT NO. : 4,119,827
DATED : October 10, 1978
INVENTOR(S) : Clayton R. Lenox

It is certified that error appears in the above-identified patent and that said Letters Patent are hereby corrected as shown below:

Column 6, line 26, "feerous" should read -- ferrous --.

Column 6, line 31, "non-gerrous" should read -- non-ferrous --.

Column 7, line 56, "portin" should read -- portion --.

Column 7, line 67, "surfaceopposite" should read -- surface opposite --.

Column 8, line 19, "on-ferrous" should read -- non-ferrous --.

Column 8, line 47, "the" should read -- said --.

Signed and Sealed this

Twenty-second Day of May 1979

[SEAL]

Attest:

RUTH C. MASON
Attesting Officer

DONALD W. BANNER
Commissioner of Patents and Trademark